US011939062B2

United States Patent
Hagiwara et al.

(10) Patent No.: US 11,939,062 B2
(45) Date of Patent: Mar. 26, 2024

(54) AIRCRAFT LAVATORY UNIT

(71) Applicant: JAMCO CORPORATION, Tokyo (JP)

(72) Inventors: Hisaya Hagiwara, Tokyo (JP); Sachiko Fukutomi, Tokyo (JP); Robert Keiichi Nakamoto, Tokyo (JP)

(73) Assignee: JAMCO CORPORATION, Tokyo (JP)

( * ) Notice: Subject to any disclaimer, the term of this patent is extended or adjusted under 35 U.S.C. 154(b) by 136 days.

(21) Appl. No.: 17/770,470

(22) PCT Filed: Mar. 27, 2020

(86) PCT No.: PCT/JP2020/013994
§ 371 (c)(1),
(2) Date: Apr. 20, 2022

(87) PCT Pub. No.: WO2021/192217
PCT Pub. Date: Sep. 30, 2021

(65) Prior Publication Data
US 2022/0388662 A1 Dec. 8, 2022

(51) Int. Cl.
*B64C 11/02* (2006.01)
*A47D 5/00* (2006.01)
(Continued)

(52) U.S. Cl.
CPC .............. *B64D 11/02* (2013.01); *A47D 5/003* (2013.01); *A47D 5/006* (2013.01); *B64D 11/0015* (2013.01)

(58) Field of Classification Search
CPC .................................................... B64D 11/02
See application file for complete search history.

(56) References Cited

U.S. PATENT DOCUMENTS

| 8,944,377 B2 * | 2/2015 | McIntosh | B64G 1/60 244/118.5 |
| 2004/0227034 A1* | 11/2004 | Wentland | B64D 11/02 244/119 |

(Continued)

FOREIGN PATENT DOCUMENTS

| CN | 108185730 A | * 6/2018 | ............. A47D 13/08 |
| CN | 108185730 A | 6/2018 | |

(Continued)

OTHER PUBLICATIONS

International Search Report for corresponding Application No. PCT/JP2020/013994, dated Jun. 23, 2020.

(Continued)

*Primary Examiner* — Richard G Davis
(74) *Attorney, Agent, or Firm* — Renner, Otto, Boisselle & Sklar, LLP (57) ABSTRACT

Provided is an Aircraft Lavatory Unit 20 that ensures lavatory user comfort while facilitating diaper changing. The Aircraft Lavatory Unit 20 includes a Diaper Changing Table 10 on which an infant can be placed and which can be selectively changed between a Housed State in which the Diaper Changing Table 10 is housed in a Wall Surface and a Pulled-Out State in which the Diaper Changing Table 10 is pulled out from the Wall Surface; and a display 25 which is disposed to face the Diaper Changing Table 10 in the Pulled-Out State and display still images or videos.

4 Claims, 6 Drawing Sheets

(51) Int. Cl.
B64D 11/00 (2006.01)
B64D 11/02 (2006.01)

(56) References Cited

U.S. PATENT DOCUMENTS

| | | | |
|---|---|---|---|
| 2016/0059965 A1* | 3/2016 | Koyama | A47K 17/026 |
| | | | 244/118.5 |
| 2019/0352009 A1 | 11/2019 | Young et al. | |
| 2021/0282607 A1* | 9/2021 | McIntosh | A47K 17/024 |

FOREIGN PATENT DOCUMENTS

| | | | | |
|---|---|---|---|---|
| WO | 2014033786 A | 3/2014 | | |
| WO | WO-2014033786 A1 * | 3/2014 | | A47D 5/003 |

OTHER PUBLICATIONS

Written Opinion for corresponding Application No. PCT/JP2020/013994, dated Jun. 23, 2020.

* cited by examiner

AIRCRAFT LAVATORY UNIT

TECHNICAL FIELD

The present invention relates to an Aircraft Lavatory Unit.

BACKGROUND OF THE INVENTION

There are requests from passengers with infants who use aircraft to change diapers or the like without disturbing other passengers. In order to meet these requests, aircraft provide lavatories with Diaper Changing Tables are already in service. An example of a lavatory provided with a Diaper Changing Table is disclosed in Patent Document 1, for example.

General aircraft lavatories have a relatively narrow interior space in order to effectively utilize the allocated space inside the aircraft. Accordingly, Diaper Changing Tables are usually housed in a wall of the lavatory so as not to interfere with passengers who use the toilet and are pulled out and used as necessary.

CITATION LIST

Patent Documents

[Patent Document 1] WO 2014/033786

SUMMARY OF INVENTION

Technical Problem

Incidentally, infants on board an aircraft may feel uncomfortable in the decompressed aircraft cabin or unfamiliar environments and may be irritable. Accordingly, when changing diapers in a narrow lavatory, it may be difficult to change infant's diapers smoothly. On the other hand, it is difficult to provide large spaces in the lavatory such that infants can relax, for example.

Accordingly, it is an object of the present invention to provide an Aircraft Lavatory Unit that ensures lavatory user comfort while facilitating diaper changing.

Means for Solving the Problems

In order to achieve the above object, an Aircraft Lavatory Unit according to the present invention includes a Movable Table on which an infant can be placed and which can be selectively changed between a Housed State in which the Movable Table is housed in a Wall Surface and a Pulled-Out State in which the Movable Table is pulled out from the Wall Surface; and a display which is disposed to face the Movable Table in the Pulled-Out State and displays still images or videos.

Advantageous Effects of Invention

According to the present invention, it is possible to provide an Aircraft Lavatory Unit that ensures lavatory user comfort while facilitating diaper changing.

DESCRIPTION OF EMBODIMENT(S)

Figure 1:
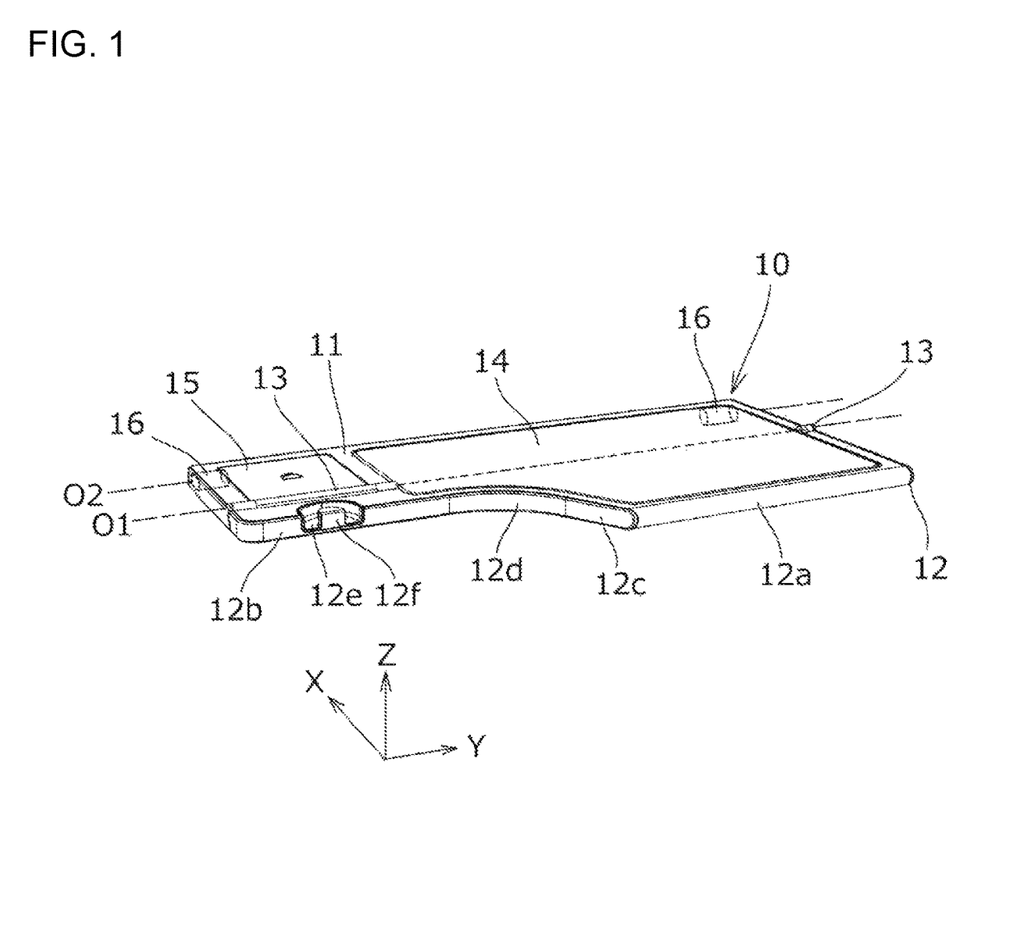
FIG. 1 is a perspective view illustrating a Diaper Changing Table used in an Aircraft Lavatory Unit according to the embodiments of the present invention.

FIG. 1 is a perspective view of a Diaper Changing Table used in an Aircraft Lavatory Unit according to the embodiments of the present invention. In FIG. 1, the vertical direction is set as the Z direction, and the directions perpendicular to the Z direction are set as the X direction and the Y direction.

The Diaper Changing Table (Movable Table) 10 includes a first resin plate 11 and a second resin plate 12. The first resin plate 11 has a rectangular plate shape elongated in the Y direction. The second resin plate 12 has a dimension and thickness in the Y direction substantially equal to the first resin plate 11, and is formed by connecting a Wide Portion 12a, a Transition Portion 12c, and a Narrow Portion 12b. The width of the Narrow Portion 12b in the X direction is narrower than that of the Wide Portion 12a, and the Transition Portion 12c connects the Wide Portion 12a and the Narrow Portion 12b. The width of the Transition Portion 12c in the X direction gradually increases from the Narrow Portion 12b toward the Wide Portion 12a.

The edge of the second resin plate 12 on the side of the first resin plate 11 has a straight shape, but the edge on the side opposite to the first resin plate 11 has a stepped shape, and in particular, an arc edge 12d formed in an arc shape is formed on the edge of the Transition Portion 12c.

The first resin plate 11 and the second resin plate 12 are rotatably connected to each other around the axis O1 by a first hinge 13. Artificial Leather 14 having a substantially pentagonal shape is attached from the upper surface of the Wide Portion 12a and the Transition Portion 12c of the second resin plate 12 to the upper surface of the first resin plate 11. A material having excellent cushioning properties such as urethane foam is arranged between the Artificial Leather 14 and the first resin plate 11 and the second resin plate 12, and the design is such that no discomfort is caused when the baby is laid on the Artificial Leather 14. Further, the Artificial Leather 14 has excellent waterproof characteristics, and even if a liquid is spilled on the Artificial Leather 14, it can easily be wiped off.

On the first resin plate 11, a Luggage Storage Area 15 is provided adjacent to the Artificial Leather 14. The Luggage Storage Area 15 can be used, for example, as a place for passengers using the Diaper Changing Table 10 to store their luggage.

A semicircular concave portion 12e is formed from the upper surface of the Narrow Portion 12b of the second resin plate 12 to the edge opposite to the first resin plate 11, and a protrusion 12f is formed in the center of the concave portion 12e. The handle of a bag of the passenger using the Diaper Changing Table 10 can be hooked on the protrusion 12f.

The first resin plate 11 includes a second hinge 16 in the vicinity of the edge opposite to the second resin plate 12, such that the first resin plate 11 is rotatable around the axis O2.

Figure 2:
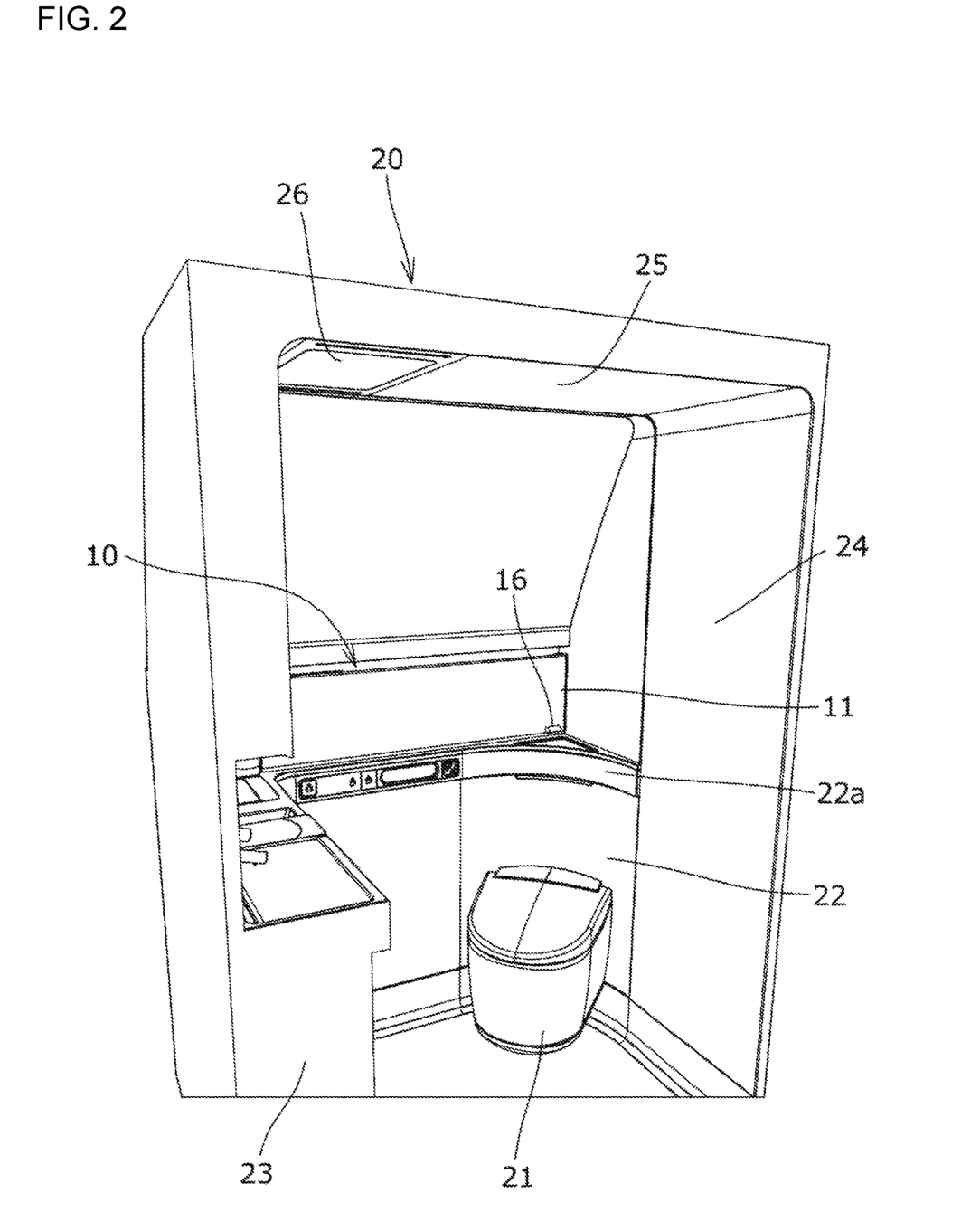
FIG. 2 is a perspective view illustrating an Aircraft Lavatory Unit according to the present embodiments in a state in which the Diaper Changing Table is housed.
Figure 3:
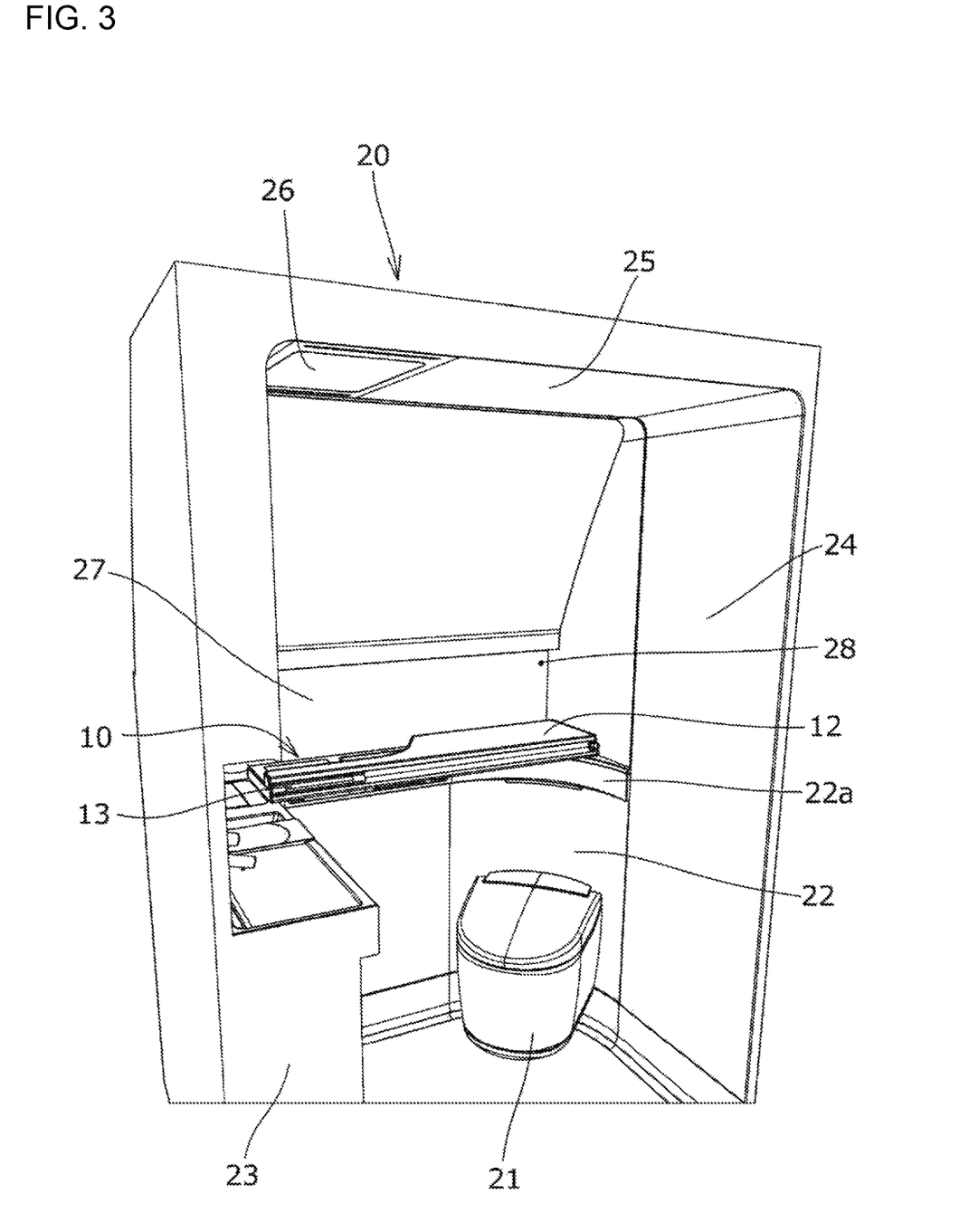
FIG. 3 is a perspective view illustrating an Aircraft Lavatory Unit according to the present embodiments in a state in which the Diaper Changing Table is pulled out one step.
Figure 4:
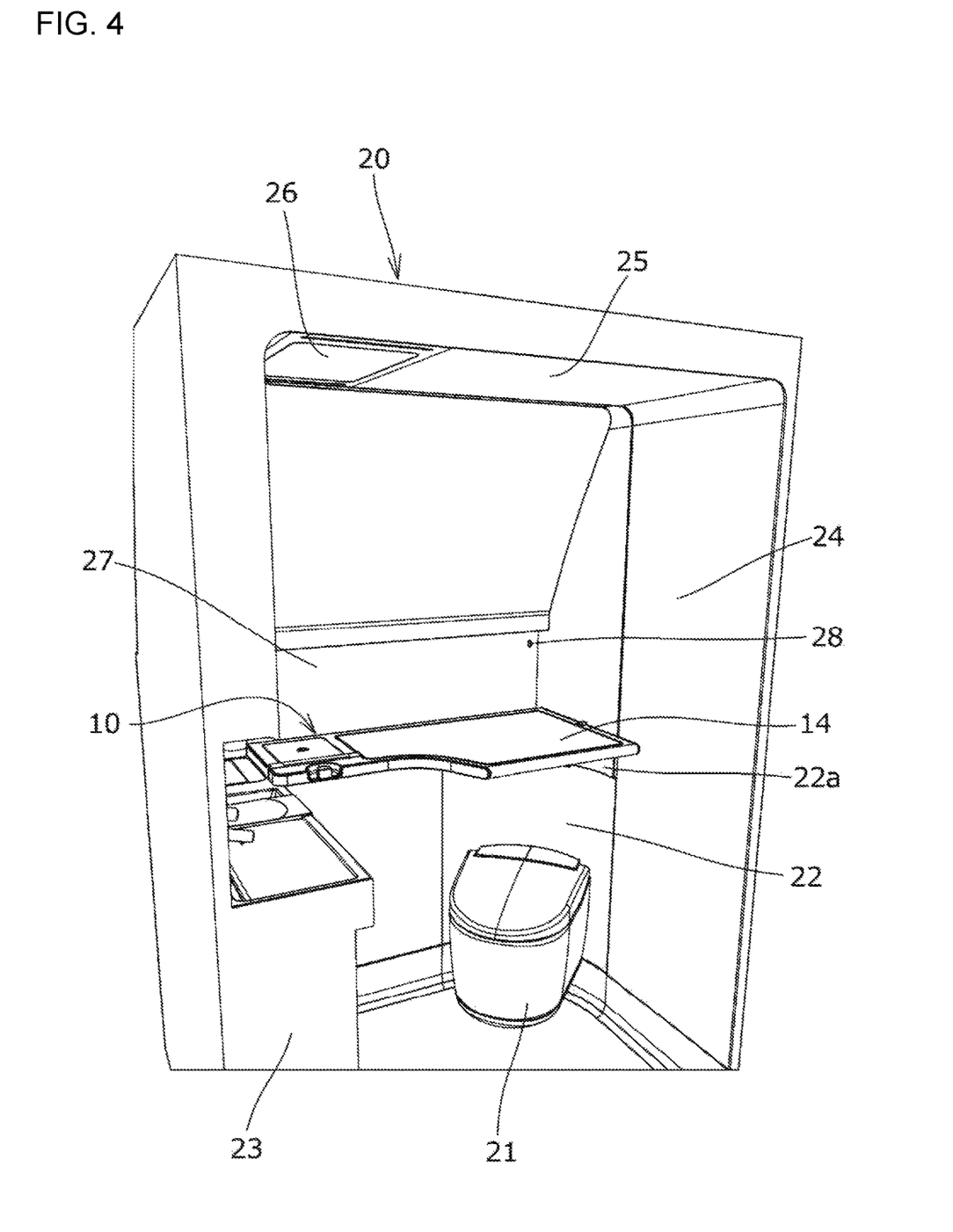
FIG. 4 is a perspective view illustrating an Aircraft Lavatory Unit according to the present embodiments in a state in which the Diaper Changing Table is completely pulled out.

FIG. 2 to FIG. 4 are perspective views illustrating the inside of the Aircraft Lavatory Unit 20 according to the present embodiments, but the wall provided with the door is not shown so that the internal configuration can be easily understood. The Aircraft Lavatory Unit 20 has a toilet 21 installed on a floor surface or a side Wall Surface, a Water Washing Valve Unit 22 installed behind the toilet 21, and a washstand 23 arranged so as to be in contact with the Wall Surface.

The Water Washing Valve Unit 22 is covered with a triangular columnar cover structure 22a. The upper portion of the cover structure 22a is firmly connected to the Wall Surface. The height from the floor surface to the upper surface of the cover structure 22a is equal to the height from the floor surface to the upper surface of the washstand 23. The second hinge 16 of the first resin plate 11 of the Diaper Changing Table 10 is connected to the Wall Surface in the vicinity of the cover structure 22a and the vicinity of the washstand 23.

Further, a first display 24 is arranged from the floor surface to the ceiling surface on the Wall Surface of the Aircraft Lavatory Unit (hereinafter referred to as a lavatory unit) 20 facing the washstand 23, and a second display 25 is arranged on the ceiling surface adjacent to the first display 24. A passenger service unit (PSU) 26 that stores an oxygen mask or the like for use in an emergency is arranged on the ceiling surface adjacent to the second display 25. The first display 24 and the second display 25 can display still images or videos via a control unit (not shown).

As illustrated in FIG. 3 and FIG. 4, a Contact Type switch 28 is arranged on the Housing Wall Surface 27 above the cover structure 22a. The Contact Type switch 28 is connected to a control unit (not shown) such that an electric signal can be transmitted. It should be noted that the location of the Contact Type switch 28 is not limited to the above. In addition, the switch is not limited to a Contact Type switch, and a switch using an infrared sensor, for example, may be provided.

In the Diaper Changing Table 10, by relatively rotating the first resin plate 11 and the second resin plate 12 around the first hinge 13, the first Artificial Leather 14 attached to both can be folded so as to fold in half at the location illustrated by the dotted line in FIG. 1. FIG. 2 illustrates a Housed State in which the folded first resin plate 11 and the second resin plate 12 are brought into contact with the Housing Wall Surface 27. In such a stored state, a latch (not shown) engages with the Diaper Changing Table 10 so that the first resin plate 11 and the second resin plate 12 do not fall inadvertently. Further, when the back surface of the second resin plate 12 presses the Contact Type switch 28 in the Housed State, an off signal is output.

By releasing the latch (not shown) from the state illustrated in FIG. 2, the Diaper Changing Table 10 can be rotated around the second hinge 16 and pulled out to an intermediate Pulled-Out State illustrated in FIG. 3. In such an intermediate Pulled-Out State, the first resin plate 11 and the second resin plate 12 overlap each other, and both ends of the first resin plate 11 are supported by the cover structure 22a and the upper surface of the washstand 23.

From the state illustrated in FIG. 3, the second resin plate 12 can be further rotated around the first hinge 13 to be pulled out to the completely Pulled-Out State illustrated in FIG. 4. In such a completely Pulled-Out State, the upper surfaces of the first resin plate 11 and the second resin plate 12 have the same height, and both ends of the first resin plate 11 and the second resin plate 12 are supported by the cover structure 22a and the upper surface of the washstand 23. In the intermediate Pulled-Out State and the complete Pulled-Out State, the back surface of the second resin plate 12 is separated from the Contact Type switch 28, such that an on signal is output. In the completely Pulled-Out State, the arc edge 12d is located on the outside the toilet 21 in a plan view.

According to the present embodiments, by housing the Diaper Changing Table 10 in a state in which the first resin plate 11 and the second resin plate 12 are folded, compact housing can be achieved. As a result, the passengers who use the toilet 21 are not disturbed. In addition, by deploying the first resin plate 11 and the second resin plate 12 in the completely Pulled-Out State, it is possible to provide a sufficient working area for changing diapers for infants.

Figure 5:
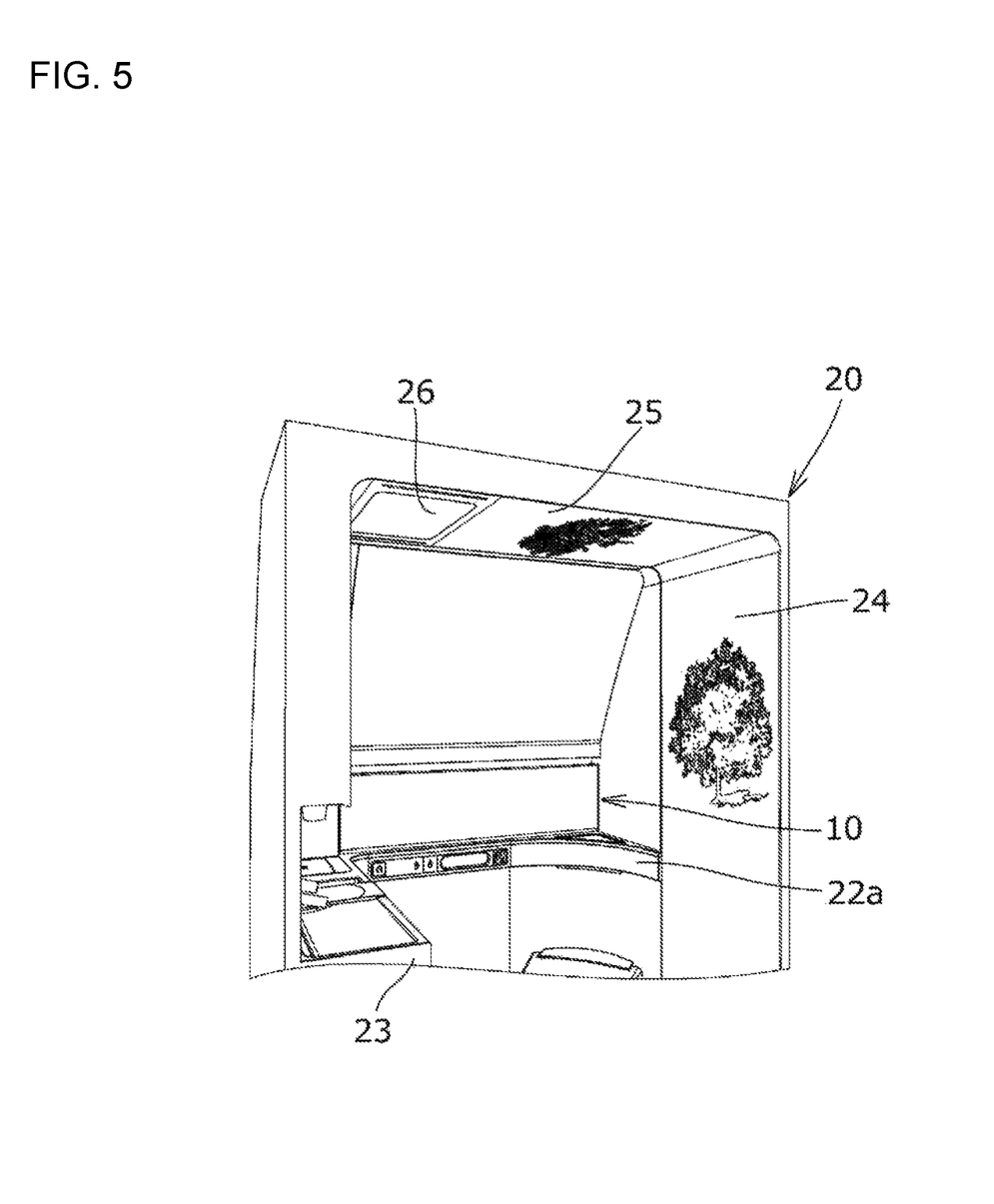
FIG. 5 is a perspective view illustrating a state prior to use of the Aircraft Lavatory Unit according to the present embodiments.

Next, a usage mode of the lavatory unit 20 will be described. When passengers are not using the lavatory unit 20, as illustrated in FIG. 5, the first display 24 and the second display 25 display still images or videos expected to have a soothing effect, such as forests and beaches. Accordingly, when a passenger enters the lavatory by opening the door and enters inside, the still images or videos of the first display 24 and the second display 25 are immediately visible, and the comfortability of the lavatory is increased. It should be noted that the still images or videos displayed on the first display 24 and the second display 25 are not limited to those taken of forests, beaches, or the like.

As described above, in the present embodiment, still images or videos are constantly displayed on the first display 24 and the second display 25. However, the first display 24 and the second display 25 may not display images until the door lock sensor detects opening of the door lock, thereby displaying still images or videos in response to the door lock detection.

In addition, a directional speaker may be installed in the lavatory unit 20, and bird chirping, the sound of waves, or similar corresponding sounds to the still images or videos of the first display 24 and the second display 25 may be played so as to be heard by the passengers using the toilet 21.

In the lavatory unit 20, a passenger who wants to change an infant diaper may grip the first resin plate 11 and the second resin plate 12 after entering the lavatory, deploy them as illustrated in FIG. 2 to FIG. 4, and put the Diaper Changing Table 10 in a completely Pulled-Out State. At this time, even when the passenger is holding an infant with one hand, the Diaper Changing Table 10 can be pulled out with the remaining free hand.

When the Diaper Changing Table 10 is completely pulled out, an on signal is output from the Contact Type switch 28. Accordingly, the control unit (not shown) that inputs this signal forms still images or videos including content for infants via the first display 24 and the second display 25. The content for infants includes, for example, still images or videos related to animals or cartoons. It should be noted that only the second display 25 may be switched to a still image or a video having content for infants.

Figure 6:
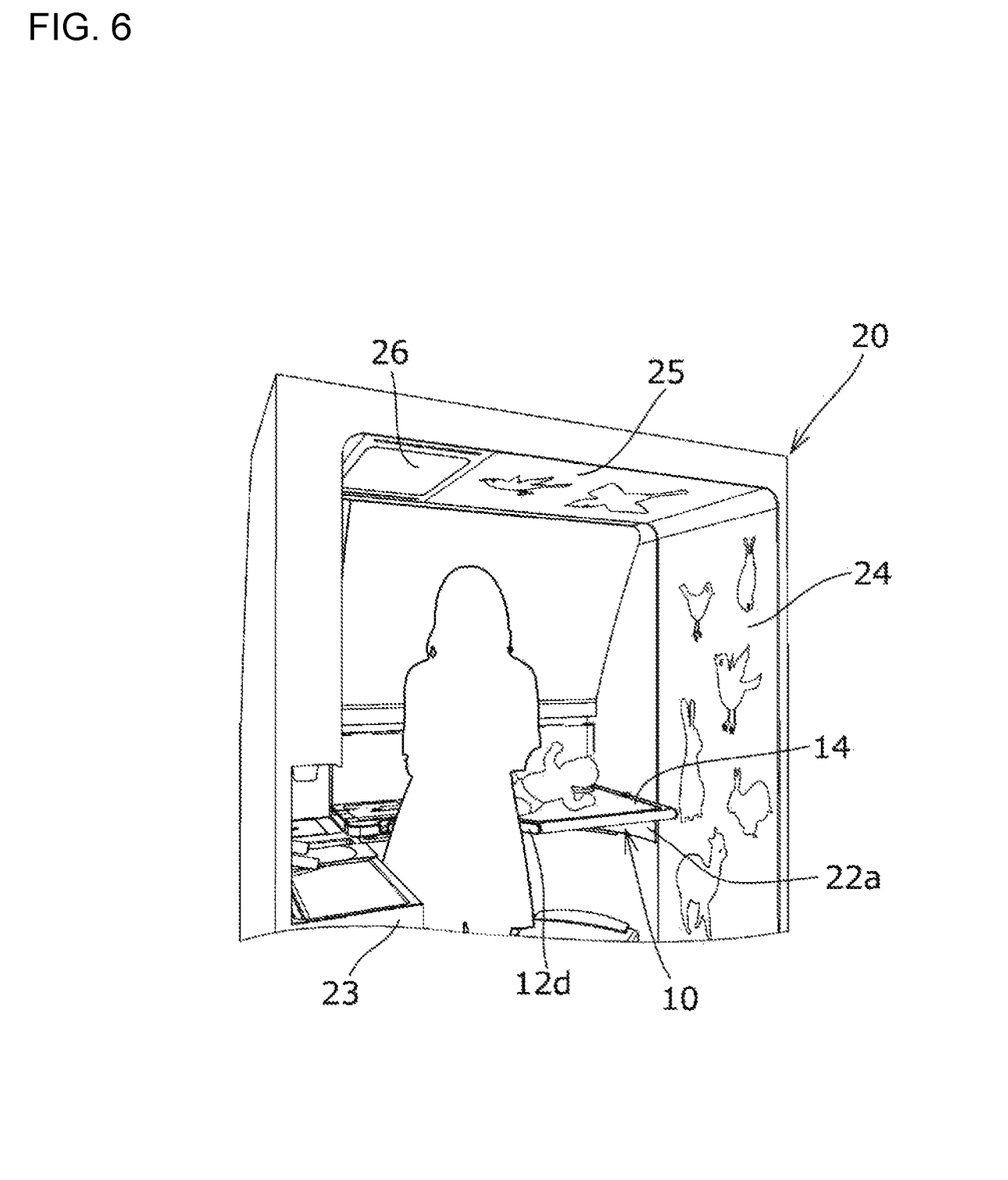
FIG. 6 is a perspective view illustrating a state in which a Diaper Changing Table according to the present embodiments is used in an Aircraft Lavatory Unit.

Further, the passenger places the baby they were holding on the first Artificial Leather 14 on the first resin plate 11 and the second resin plate 12. At this time, in order to effectively use the large area of the first Artificial Leather 14, it is preferable that the head of the baby faces the far side (the side farthest from the arc edge 12*d*). Further, as illustrated in FIG. 6, by means of the passenger standing at a location where their body faces the arc edge 12*d*, since the space can be effectively used even if the inside of the lavatory unit 20 is small, it is possible to easily perform work such as changing diapers from the direction of the infant's feet.

During the diaper change, it is expected that the attention of the infant lying face-up on the Diaper Changing Table 10 will be drawn to the still images or videos including content for infants that is displayed on the second display 25 on the ceiling surface in front of their line of sight, such that the infant will be calmed. This allows passengers to easily change diapers.

In addition, a highly directional speaker may be installed in the lavatory unit 20, and animal calls, cartoon audio or the like corresponding to the still images or videos of the first display 24 and the second display 25 may be played so as to be heard by the infant.

Passengers who have finished changing diapers can pick up the baby again from the Diaper Changing Table 10 and fold and house the Diaper Changing Table 10 with one hand in the reverse order to that illustrated in FIG. 2 to FIG. 4.

Although an Aircraft Lavatory Unit according to the present embodiments has been described above, the present invention is not limited to the above specific examples, and various modifications can be made. For example, the first display 24 and the second display 25 can also function as mirrors by operating a switch (not shown). Further, when the first display 24 and the second display 25 are made to function as mirrors, a timer may be activated to return to the display of a predetermined still image or video after a certain period of time has elapsed. In addition, the Diaper Changing Table 10 is not limited to changing diapers, and can be used, for example, for changing infant clothes and for applying medicine to the skin of infants. In addition, the displays 24, 25 can be configured by connecting a plurality of displays, respectively, or can be formed as one continuous display.

REFERENCE SIGNS LIST

10: Diaper Changing Table, 11: First resin plate, 12: Second resin plate, 13: First hinge, 14: Artificial Leather, 15: Luggage Storage Area, 16: Second hinge, 20: Aircraft Lavatory Unit, 21: Toilet, 22: Water Washing Valve Unit, 23: Washstand, 24: First display, 25: Second display, 26: PSU, 27: Housing Wall, 28: Contact Type switch

The invention claimed is:

1. An aircraft lavatory unit comprising:
    a first wall surface, and a second wall surface separate from the first wall surface;
    a movable table on which an infant can be placed and which can be selectively changed between a housed state in which the movable table is housed in the first wall surface and a pulled-out state in which the movable table is pulled out from the first wall surface; and
    a display housed in the second wall surface, disposed to face the movable table in the pulled-out state, and that displays still images or videos.
2. The aircraft lavatory unit according to claim 1, wherein: the display displays a still image or a video having content for infants in response to the movable table changing to the pulled-out state.
3. The aircraft lavatory unit according to claim 1, wherein: the movable table includes a first plate and a second plate rotatable with respect to the first plate;
    in the housed state, the first plate and the second plate are folded; and
    in the pulled-out state, the first plate and the second plate are in a deployed state.
4. The aircraft lavatory unit according to claim 3, wherein: the second plate is formed by connecting a wide portion, a narrow portion, and a transition portion disposed between the wide portion and the narrow portion.

\* \* \* \* \*